T. J. LEWIS.
SECURING MEANS.
APPLICATION FILED SEPT. 26, 1916.
1,256,706.
Patented Feb. 19, 1918.
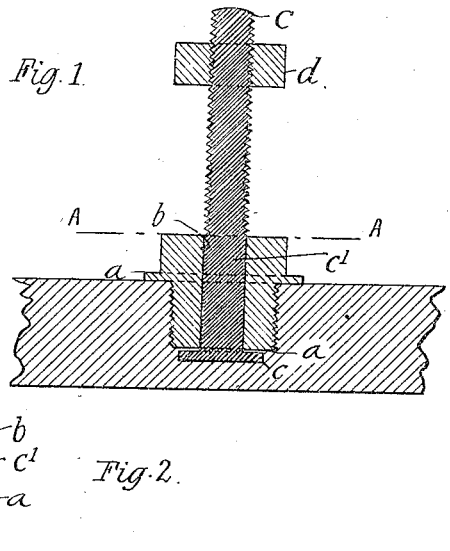
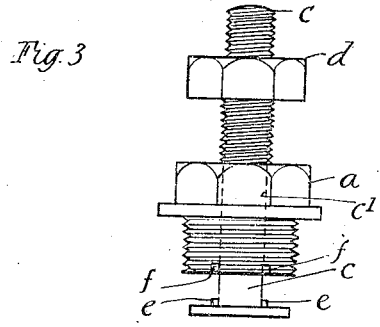

UNITED STATES PATENT OFFICE.

THOMAS JOHN LEWIS, OF ARGOED, ENGLAND.

SECURING MEANS.

1,256,706.                Specification of Letters Patent.      Patented Feb. 19, 1918.

Application filed September 26, 1916. Serial No. 122,246.

*To all whom it may concern:*

Be it known that I, THOMAS JOHN LEWIS, a subject of the King of England, residing at Argoed, in the county of Monmouthshire, in England, have invented a new and useful Improvement in Securing Means, of which the following is a specification.

This invention relates to stud-screws such as are used for adjustably securing the glands in piston-rod stuffing-boxes, and for similar purposes, my object being to save the work of having to drill out broken stud-screws.

The invention comprises a plug-screw formed with an externally screw-threaded body-portion, and a stud or pin having a nut working on the free end thereof and formed with a fixed head at the inset end, said plug-screw being slidably seated on the shank or plain portion of the stud and with the screw-threaded body portion in direct non-turnable contact with the fixed head of the stud.

In order to fully explain my invention, I will describe the same with reference to the accompanying drawings which show the invention applied to the flange of a stuffing box:—

Figure 1 is a sectional view of one form of construction; Fig. 2, is a cross-section on line A—A of Fig. 1; and Fig. 3, is a front view of a modified construction.

The same letters of reference are used to denote the same or similar parts.

According to the constructional form shown in Figs. 1 and 2, I provide a plug-screw $a$ bored centrally with a square hole $b$ through which is passed a slidable stud or pin $c$, a portion $c^1$ thereof being shaped to correspond with the hole $b$ in the plug-screw $a$, the length of said portion $c^1$, not exceeding the length of the full plug-screw $a$. The remaining portion of the stud $c$ is circular and threaded to receive a tightening up nut $d$.

The hole in the plug-screw may, if preferred, be triangular or of any polygonal form desired and the shank or neck of the stud or pin is then similarly shaped for a portion of its length corresponding to the length of the plug-screw so as to fit within the latter.

In the form shown in Fig. 3, I have simplified the previous arrangement by using a circular hole in the plug-screw $a$ with a correspondingly sectioned stud or bolt. To prevent the stud from turning when the plug-screw $a$ is screwed into position, I provide two small projections at the near side of the stud-head $e$ fitting into recesses $f$ in the plug-screw $a$, or vice versa. The advantage here is that the standard size plug-screws can be used for holding the studs fast in position.

In operation, and as applied for example to an oval piston-rod stuffing-box two of these devices are made use of, the plug-screw $a$ with the studs therein being screwed into the stuffing-box flange, or cylinder plate or head, one at each side of the piston rod. After inserting the packing, the gland is placed in position with the screwed outer or free ends of the studs $c$ passed through bolt holes in the gland flange. The tightening nuts $d$ are then threaded on the screwed ends of the studs so that the gland is thus secured in position.

When the stud or pin $c$ is broken, worn out or damaged, all that is necessary is to unscrew the plug-screw $a$ from the stuffing flange, or the like and take out damaged stud $c$. It can then be replaced with a new one and a saving in time and labor is effected as there are no broken pins to be bored out or holes to be re-drilled.

I claim

A stud-screw, a head to same, a shank extending from the head, a slidable but not turnable plug-screw on the shank adjacent said head, and a screw-threaded free-end portion in connection with the shank, as and for the purpose stated.

THOMAS JOHN LEWIS.

Witnesses:
 WILLIAM J. PERKINS,
 FLORENCE H. LITTLE.